Dec. 23, 1941. F. LUX 2,266,878
SYNCHRONOUS MOTOR
Filed Jan. 29, 1940 2 Sheets-Sheet 1

Inventor
Frederick Lux
By Rockwell & Larchotow
Attorneys

Dec. 23, 1941.   F. LUX   2,266,878
SYNCHRONOUS MOTOR
Filed Jan. 29, 1940   2 Sheets-Sheet 2
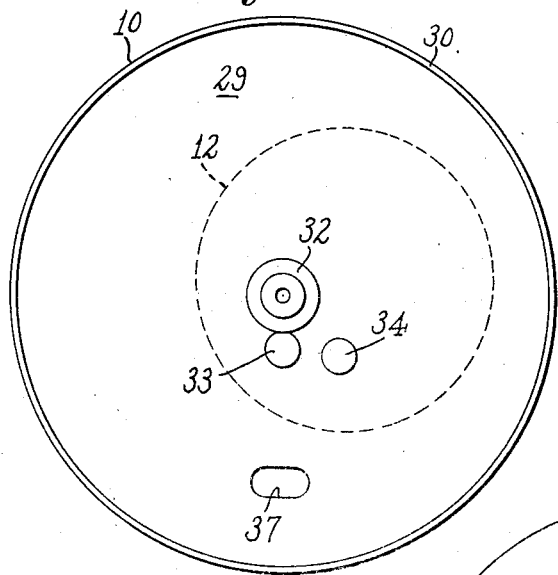
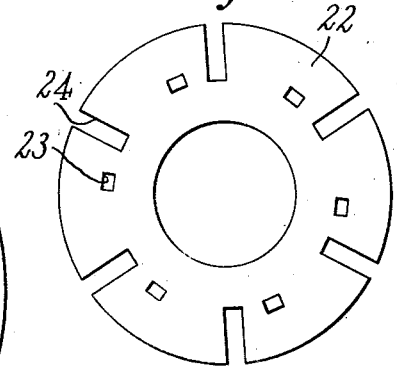
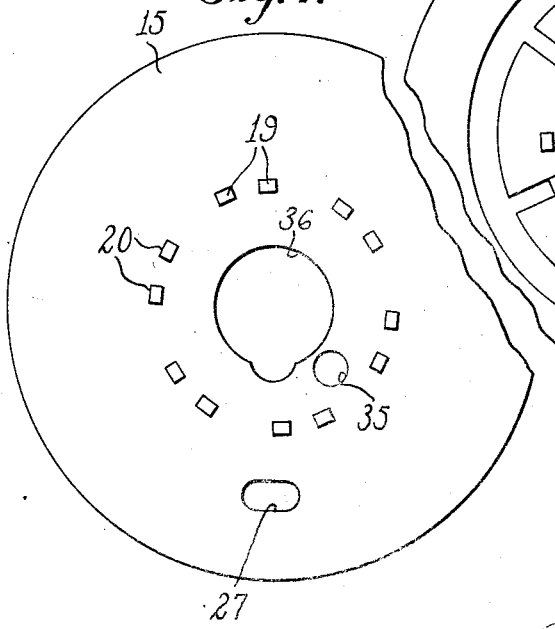
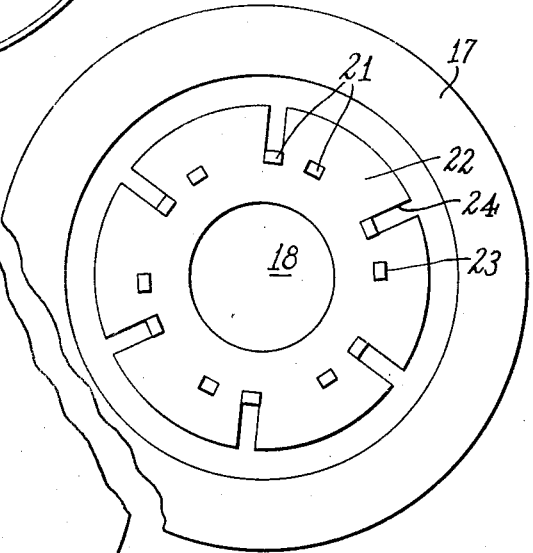
Inventor
Frederick Lux
By Rockwell-Bartholow
Attorneys Patented Dec. 23, 1941

2,266,878

UNITED STATES PATENT OFFICE 2,266,878

SYNCHRONOUS MOTOR

Frederick Lux, Waterbury, Conn., assignor to The Lux Clock Mfg. Company, Inc., Waterbury, Conn., a corporation of Connecticut Application January 29, 1940, Serial No. 316,152

2 Claims. (Cl. 172—278)

This invention relates to electric motors, and more particularly to small motors of the synchronous and self-starting type, such, for example, as are used in connection with clocks or other timing instruments, where requirements call for a smoothly running motor operating accurately in synchronism with the pulsations of the current which is supplied to the motor, and which will also have a sufficient starting and operating torque.

One of the objects of the invention is the provision of an improved synchronous electric motor of relatively simple construction and which will be economical to manufacture and which will at the same time operate smoothly and quietly.

Still another object of the invention is the provision of a relatively simple synchronous electric motor which will run accurately at a true synchronous speed rather than at a sub-synchronous speed, as is the case with many of the motors now in operation.

A still further object of the invention is the improvement of the supporting structure of the motor parts, whereby the parts may be readily and economically formed and assembled to provide in the completed structure a motor which, while it is of relatively low cost, will at the same time operate accurately, smoothly and practically without noise or hum.

A still further object of the invention is the provision of an electric motor having pole pieces projecting in opposite directions from the sides of the motor case, the pole pieces supported upon one side of the case standing between those upon the other side, and surrounding a rotor of novel form, whereby the entire assembly will be small and compact, and the resulting motor will operate smoothly and quietly at a true synchronous speed.

To these and other ends the invention consists in the novel features and combinations of parts to be hereinafter described and claimed.

In the accompanying drawings:

Fig. 6 is an interior view of the gear case supporting member;

Fig. 7 is a face view of the disk for supporting one of the sets of projecting poles;

Fig. 8 is a front elevational view of one of the shading members; and

Fig. 9 is a face view of the flanged cup member and the projecting poles secured thereto, the shading disks being shown in position on the poles.

Figure 1:
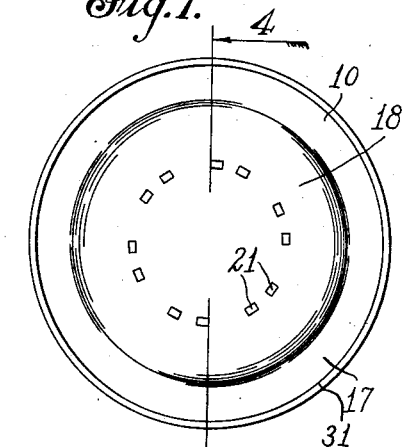
Fig. 1 is a front elevational view of a motor embodying my invention.
Figure 2:
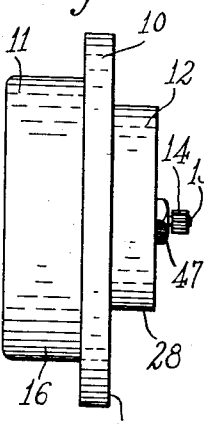
Fig. 2 is a side view of the same.
Figure 3:
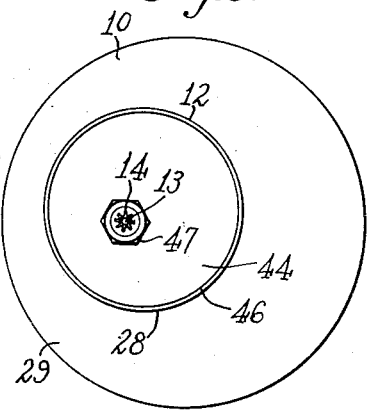
Fig. 3 is a rear elevational view of the motor.

As shown in Figs. 1, 2 and 3 of the drawings, there is provided a supporting structure, which will be described more in detail hereinafter, and which comprises an outwardly projecting flange portion 10 having upon one side thereof the casing 11 which contains most of the motor parts, and on the other side thereof a gear casing 12 which contains the reduction gearing, and from which projects the shaft 13 having thereon the pinion 14 by which the motion of the motor may be communicated to any part which it is desired to operate.

Figure 4:
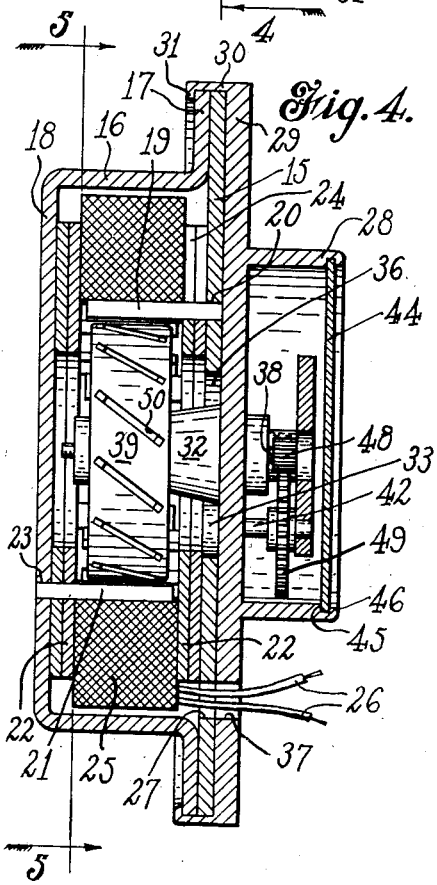
Fig. 4 is a sectional view on line 4—4 of Fig. 1.

As shown more especially in Fig. 4, the motor proper is comprised of a disk-shaped pole-supporting member 15 and a cup-shaped pole-supporting member 16, the latter having a flange 17 to abut against the outer face of the disk 15, so that the motor parts will be enclosed between the disk and the bottom portion 18 of the cup.

As shown more especially in Fig. 7, supported from the disk 15 are a plurality of projecting pole members in the form of pins 19. These pins are rectangular in cross section, as shown, and may be conveniently struck from a piece of sheet material, and thereafter be pressed into the openings 20 in the plate by a driving fit, so that they will be rigidly secured to the disk or plate 15 to project therefrom at right angles to the plane of the disk. As shown, there are twelve of these pins or poles all together, supported by the disk 15, the poles being arranged in groups of two, or pairs.

Figure 5:
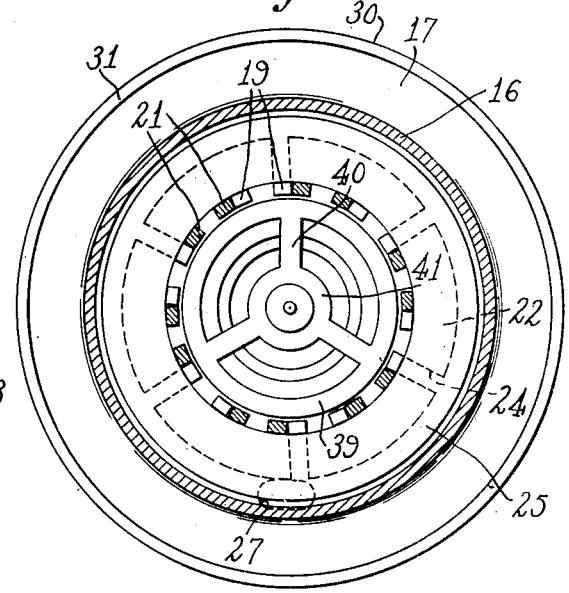
Fig. 5 is a sectional view on line 5—5 of Fig. 4.

Likewise secured in a similar manner to the bottom portion 18 of the cup member 16 are a similar number of projecting pins or poles 21, and it will be observed from Figs. 4 and 5 that one pair of poles upon the disks will project or be disposed between a pair of poles supported from the cup, the spacing of the poles upon one of the supporting members being similar to that of the poles upon the other member. It will also be observed that the poles are supported upon one end only, the other ends being free and terminating short of contact with the opposite member.

In order that the motor be self-starting, means are provided for shading one of the poles of each pair. For this purpose the shading disks 22 are employed, shown more especially in Fig. 8, these disks being provided with alternate rectangular perforations 23 and slots 24 extending through the periphery of the disk, so that one of each pair of poles will be received in the perforation 23, and the other in the slot 24. As will be well understood, this provides for a lag in the magnetic flux passing through the pole received in the perforation 23, as the flux will pass around this pole through the material of the disk 22, while it will not be allowed to pass around the pole received in the slot 24. The disks 22 may be made of copper or some good conducting material.

As shown in Fig. 4, a pair of disks 22 is placed against the bottom portion 18 of the cup member 16, and likewise a pair of disks 22 is placed adjacent the disk member 15, so that both sets of salient poles will be provided with the shading disks. It will, of course, be apparent that in placing the disks upon the poles care must be taken that the perforations 23 must lie on the same side of the slot 24 in the shading disks associated with the member 18, as is the case with the shading disks associated with the member 15.

A coil 25 of circular form is placed within the cup 16 surrounding the pole members 19 and 21, which pole pieces, when the parts are assembled, as shown in Fig. 5, substantially form a circular cage. This coil takes up very little room and the single coil serves to energize all of the pole pieces, and may receive its current through the lead wires 26 extending outwardly through an opening 27 in the disk member 15.

At the rear of the motor casing is a gear casing 28 which may be formed integrally with a die cast cup member 29 having a peripheral wall or flange 30 within which the edge of the disk 15 and the flange 17 are snugly received. The upper edge of the wall 30 may be displaced inwardly or turned over a shown at 31, to hold the disk 15 and cup 16 securely together, thus keeping the parts in assembled relation. This die cast member 29 is shown more particularly in Fig. 6, and is provided with bearing bosses 32 and 33 and a locating boss 34, which latter is designed to be received in an opening 35 in the disk 15 to properly position these two parts, as shown in Fig. 7. The disk-like supporting member 15 is provided with a central opening 36 to embrace the bosses 32 and 33 in addition to the opening 35, just referred to, and the opening 27, to permit the passage of the lead wires. Likewise the die cast cup member 29 is provided with an opening 37 registering with the opening 27 to permit the wires to pass therethrough.

In the bearing boss 32 is rotatably mounted the rotor shaft 38, upon which is supported a rotor 39 of cylindrical shape by means of the radial arms 40 and central hub 41. The rotor shaft 38, as shown, projects into the gear box, where a pinion 48 thereon may mesh with a gear 49 secured to a shaft 42 mounted in the boss 33. The shaft 42 may be connected in any desired manner through other suitable reduction gearing to the shaft 13, which carries the pinion 14 which lies without the gear box 28. This gear box may be closed by means of a disk 44 seated against a shoulder 45 formed adjacent the edge of the casing, and the wall of the casing may be turned over the disk 44, as shown at 46 in Fig. 4, thus rendering the casing substantially oil-tight, so that a sufficient amount of lubricant may be retained therein. As the shaft 13 projects through the casing, the space about the bearing for this shaft may be likewise sealed by the nut 47.

The rotor 39 is of special form, and as stated, comprises the cylindrical or drum member 39 carried upon the radial arms 40. This drum member is relatively wide, being of slightly less width than the coil 25, and is provided with diagonal slots 50 which terminate short of its periphery to leave the slots closed at both ends, so that there are no salient poles upon the rotor, in that the drum member 39 is truly cylindrical, and no part thereof projects outwardly from the remainder.

It will be understood that when an alternating current is passed through the field coil by means of the wires 26, the poles supported upon one of the supporting members, for example the cup 16, will be magnetized and will have one polarity, while the pole pieces projecting from the supporting disk 15 will also be magnetized and will be of the opposite polarity. It may here be stated that the members 15 and 16 are made of magnetic material, so as to permit ready flow of the magnetic flux therethrough. Moreover, it will also be apparent that one half of the poles on each of the supporting members are shaded by the shading disks 22, so that there will be a lag in the magnetic flux through these shaded poles. In other words, magnetic flux of one polarity will exist in six of the poles projecting from one of the members simultaneously with the existence of flux of the opposite polarity in the six poles projecting from the other supporting member. Thus the motor becomes a twelve-pole motor in that magnetic flux will exist simultaneously in twelve of the pole members.

Magnetic poles are produced in the rotor by the flux in the projecting pole members. As the flux shifts from the unshaded to the shaded poles, the magnetic poles in the rotor would likewise tend to shift. The rotor is preferably made of hardened steel, and its tendency is to resist the shifting of its magnetic poles, this resisting tendency being known as hysteresis or remanence. The provision of the diagonal slots in the rotor serves to permit a certain amount of movement of these magnetized spots, while at the same time limiting or preventing the free movement thereof. Therefore the tendency will be when the flux shifts from the unshaded to the shaded pole to pull the rotor along with the flux, instead of pulling the magnetized spot through the rotor. This brings about a high starting or accelerating torque. At the same time the rotor, although it has no pronounced geographical poles, will probably develop polarity to some extent in the material between the rotor slots, and will be held to a synchronous speed below that of the maximum speed which would be produced by the sarting torque alone.

Therefore the motor will run at a true synchronous speed of 600 revolutions per minute, as would be expected of a twelve-pole motor according to the usual formula, and tests have shown that a motor constructed in accordance with the principles outlined has a relatively high starting torque and will carry a relatively large load at its synchronous speed. Moreover, this synchronous speed is relatively low, and therefore needs less reduction to be applied to timing apparatus than if the speed were higher.

While I have shown and described a preferred embodiment of my invention, it will be understood that it is not to be limited to all of the details shown, but is capable of modification and variation within the spirit of the invention and within the scope of the appended claims.

What I claim is:

1. A synchronous electric motor comprising a casing of magnetic material, said casing consisting of a cup-shaped member having an outwardly flaring flange, an apertured disk-like member substantially closing said cup-shaped member and having the outer margin of one surface thereof lying flatly against said flange, a gear case supporting member abutting the other surface of said disk-like member, said gear case supporting member having an integral portion extending over the edges of the casing members and securing them together a d also having a gear case formed integrally therewith on the side opposite the disk-like member, and said supporting member having an integral shaft-supporting boss extending through the apertured disk for supporting a rotor within the casing.

2. A synchronous electric motor comprising a gear case supporting member having casing upon one face thereof, a motor casing secured to the opposite face of said member, said motor casing comprising an apertured disk-like member flatly abutting the face of said gear case supporting member, said gear case supporting member having formed thereon an extended bearing boss projecting through said aperture into the motor casing, a rotor shaft mounted in said boss to be supported thereby, and a rotor within the motor casing mounted on said shaft.

FREDERICK LUX.

CERTIFICATE OF CORRECTION.

Patent No. 2,266,878.  December 23, 1941.

FREDERICK LUX.

It is hereby certified that error appears in the printed specification of the above numbered patent requiring correction as follows: Page 3, second column, line 2, claim 2, after "having" insert --a gear--; and that the said Letters Patent should be read with this correction therein that the same may conform to the record of the case in the Patent Office.

Signed and sealed this 27th day of January, A. D. 1942.

(Seal)

Henry Van Arsdale,
Acting Commissioner of Patents.